(12) United States Patent
Morita et al.

(10) Patent No.: US 8,019,148 B2
(45) Date of Patent: Sep. 13, 2011

(54) IMAGE PROCESSING APPARATUS AND IMAGE PROCESSING METHOD

(75) Inventors: Kenji Morita, Yokohama (JP); Daisuke Kotake, Yokohama (JP); Tomohiko Shimoyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 847 days.

(21) Appl. No.: 12/051,321

(22) Filed: Mar. 19, 2008

(65) Prior Publication Data

US 2008/0240550 A1 Oct. 2, 2008

(30) Foreign Application Priority Data

Mar. 29, 2007 (JP) ................................ 2007-089047

(51) Int. Cl.
*G06K 9/00* (2006.01)
(52) U.S. Cl. ........................................ 382/154; 382/103
(58) Field of Classification Search .................. 382/100, 382/103, 106, 108, 154
See application file for complete search history.

(56) References Cited

U.S. PATENT DOCUMENTS 7,965,904 B2 * 6/2011 Kobayashi ..................... 382/292

FOREIGN PATENT DOCUMENTS

| JP | 11-084307 | 3/1999 |
| JP | 2000-041173 | 2/2000 |

OTHER PUBLICATIONS

R. M. Haralick, C. Lee, K. Ottenberg, and M. Nolle: "Review and analysis of solutions of the three point perspective pose estimation problem", Int'l. J. Computer Vision, vol. 13, No. 3, pp. 331-356, 1994.
Kato, M. Billinghurst, Asano, and Tachibana: "An Augmented Reality System and its Calibration based on Marker Tracking", Transactions of the Virtual Reality Society of Japan, vol. 4, No. 4, pp. 607-616, 1999.
A. State, G. Hirota, D. T. Chen, W. F. Garrett and M. A. Livingston: "Superior augmented reality registration by integrating landmark tracking and magnetic tracking", Proc. SIGGRAPH'96, pp. 429-438, 1996.
G. Baratoff, A. Neubeck and H. Regenbrecht: "Interactive multi-marker calibration for augmented reality applications", Proc. ISMAR2002, pp. 107-116, 2002.
D. Kotake, S. Uchiyama, and H. Yamamoto: "A marker calibration method utilizing a priori knowledge on marker arrangement," Proc. 3rd IEEE/ACM Int'l Symp. on Mixed and Augmented Reality (ISMAR 2004), pp. 89-98, Nov. 2004.

* cited by examiner

*Primary Examiner* — Claire X Wang
(74) *Attorney, Agent, or Firm* — Cowan, Liebowitz & Latman, P.C.

(57) ABSTRACT

By applying identification processing to each index included in a captured image, a set of an identifier, image coordinates, and an image number is acquired for each index, and the acquired set is registered in a data saving unit. The data saving unit manages the numbers of times of previous identification for respective identifiers. A display unit displays the number of times managed in association with an identifier in a set to be registered every time the set is registered. An index position and orientation calculation unit calculates the positions and orientations of indices corresponding to a set group using the set group registered in a memory.

11 Claims, 12 Drawing Sheets

DIRECTION DETERMINATION REGION
BIT REGION
BOUNDARY REGION

REFERENCE COORDINATE SYSTEM
CENTER
INDEX COORDINATE SYSTEM

FIG. 5

| INDEX ID | INPUT TYPE | CAPTURING COUNT | CALIBRATION STATE |
|---|---|---|---|
| 1 | USER DEFINED | 2 | REFERENCE INDEX |
| 2 | USER DEFINED | 4 | APPROXIMATE VALUES CALCULATED |
| 3 | USER DEFINED | 1 | NOT ESTIMATED |
| 4 | USER DEFINED | 3 | APPROXIMATE VALUES CALCULATED |
| 5 | USER DEFINED | 0 | NOT ESTIMATED |
| 9 | AUTOMATICALLY DETECTED | 1 | NOT ESTIMATED |
| 10 | AUTOMATICALLY DETECTED | 3 | APPROXIMATE VALUES CALCULATED |
| 13 | AUTOMATICALLY DETECTED | 4 | APPROXIMATE VALUES CALCULATED |
| 14 | AUTOMATICALLY DETECTED | 7 | APPROXIMATE VALUES CALCULATED |
| 15 | AUTOMATICALLY DETECTED | 5 | APPROXIMATE VALUES CALCULATED |

FIG. 6

| INDEX ID | INPUT TYPE | CAPTURING COUNT | CALIBRATION STATE |
|---|---|---|---|
| 1 | USER DEFINED | 2 | REFERENCE INDEX |
| 2 | USER DEFINED | 4 | OPTIMAL CALCULATIONS DONE |
| 3 | USER DEFINED | 1 | NOT ESTIMATED |
| 4 | USER DEFINED | 3 | OPTIMAL CALCULATIONS DONE |
| 5 | USER DEFINED | 0 | NOT ESTIMATED |
| 9 | AUTOMATICALLY DETECTED | 1 | NOT ESTIMATED |
| 10 | AUTOMATICALLY DETECTED | 3 | OPTIMAL CALCULATIONS DONE |
| 13 | AUTOMATICALLY DETECTED | 4 | OPTIMAL CALCULATIONS DONE |
| 14 | AUTOMATICALLY DETECTED | 7 | ERROR |
| 15 | AUTOMATICALLY DETECTED | 5 | OPTIMAL CALCULATIONS DONE |

FIG. 10

| MARKER ID | FREQUENCY |
|---|---|
| marker 1 | 0 |
| marker 5 | 1 |
| marker 2 | 4 |
| marker 3 | 5 |
| marker 10 | 7 |

DISPLAY IN RED → marker 1

DISPLAY IN YELLOW → marker 2

DISPLAY IN GREEN → marker 10

IMAGE PROCESSING APPARATUS AND IMAGE PROCESSING METHOD

BACKGROUND OF THE INVENTION

1. Field of the Invention

The present invention relates to a technique for calculating the positions and orientations of indices allocated on a physical space.

2. Description of the Related Art

In recent years, studies about Mixed Reality (MR) techniques have been extensively made. The MR techniques aim at seamlessly merging a physical space and a virtual space created by a computer. Of the MR techniques, an Augmented Reality (AR) technique has especially received a lot of attention.

An image display apparatus based on the AR technique is implemented by a video see-through system or optical see-through system. The video see-through system displays a composite image obtained by superposing and rendering, on an image of a physical space captured by an image capturing device such as a video camera or the like, an image of a virtual space generated in accordance with the position and orientation of this image capturing device. Note that the image of the virtual space includes a virtual object, text information, and the like rendered by computer graphics. The optical see-through system displays, on an optical see-through display mounted on the head of an observer, an image of a virtual space generated according to the position and orientation of the viewpoint of the observer.

Applications of the AR technique to various fields are plausible including an operation assistance that superimposes the conditions in the body onto the body surface of a patient undergoing a surgery, an architectural simulation that superimposes a virtual building on a vacant lot, an assembly assistance that superimposes the work sequence and the wiring state upon assembly, and the like.

One of the most important problems in the AR technique is how accurately the physical space and virtual space are registered, and many conventional efforts have been done. The registration problem in AR amounts to the problem of calculating the position and orientation of an image capturing device in a scene (i.e., on a reference coordinate system defined in the scene) in case of the video see-through system. Likewise, that problem amounts to the problem of calculating the position and orientation of the viewpoint of the observer or display in a scene in case of the optical see-through system.

As a method of solving the former problem, the following method is generally adopted. That is, a plurality of indices are allocated or set in a scene, and the position and orientation of an image capturing device on the reference coordinate system are calculated based on the correspondence between the projected positions of the indices in an image captured by the image capturing device, and the positions of the indices as given information on the reference coordinate system. As a method of solving the latter problem, the following method is generally used. That is, it is a common practice to mount an image capturing device on an object to be measured (i.e., on the head of the observer or on a display), and to calculate the position and orientation of the image capturing device by the same method as in the former method, thereby calculating the position and orientation of the object to be measured based on the calculation result.

The method of calculating the position and orientation of the image capturing device based on the correspondence between the projected images of indices on an image and the three-dimensional (3D) positions of these indices have been conventionally proposed in the field of photogrammetry (see non-patent reference 1).

Non-patent reference 2 proposes the following technique. That is, the position and orientation of the image capturing device, which are calculated based on the projected images of the indices on the image, are set as initial values, and the position and orientation of the image capturing device are optimized by iterative calculations so as to minimize errors between the actual observation positions of the projected images of the indices on the image, and the calculated positions of the projected images. Note that the calculated positions of the projected images are calculated from the 3D positions of the indices and the position and orientation of the image capturing device.

With the aforementioned conventional method, the position and orientation of the image capturing device are calculated based on the image captured by the image capturing device.

On the other hand, methods disclosed in, e.g., patent references 1 and 2 and non-patent reference 3 have been conventionally executed. That is, a six-degree-of-freedom position and orientation sensor such as a magnetic sensor, ultrasonic sensor, or the like is attached to an image capturing device as an object to be measured, and the position and orientation are measured in combination with detection of indices by the aforementioned image processing. Since the sensor output value can be stably obtained although its precision varies depending on the measurement range, the method that uses the sensor and image processing together can improve robustness compared to the method using the image processing alone.

In patent reference 2, the position and orientation of the image capturing device obtained from the six-degree-of-freedom position and orientation sensor are set as initial values, and the position and orientation of the image capturing device are calculated by minimizing errors between the observation positions and calculated positions of the projected images of the indices on the image by iterative calculations.

In the aforementioned registration method using indices, the following pieces of information need to be given in order to calculate the position and orientation of the image capturing device as an object to be measured on the reference coordinate system. That is, in case of dot-shaped indices (dot indices) like circular regions with an identical color on a space, the positions of their barycenters on the reference coordinate system, and the orientations of the indices with respect to the reference coordinate system need to be given. In case of polygonal indices such as triangular indices, square indices, and the like, the positions of their barycenters on the reference coordinate system need to be given. In case of such polygonal index such as a square index and the like, the index itself may often be used as a reference for a coordinate system without defining any reference coordinate system. However, when a plurality of indices are used, since the relationship between their positions and orientations need to be given, a reference coordinate system is required.

The position and orientation of each index can be measured manually using a surveying tape or protractor, or using a surveying instrument. However, measurements using images are made in terms of the precision and labor. The position of a dot index can be measured by a method called a bundle adjustment method.

The bundle adjustment method uses the following technique. That is, a large number of images of a dot index are captured by the image capturing device, and the observation positions of projected images of the point indices on the images are calculated. The position of the dot index and the position and orientation of the image capturing device are repetitively corrected by iterative calculations so as to minimize errors (projection errors) between the calculated observation positions, and the calculated positions of projected images of the dot index, which are calculated based on the 3D position of the dot index and the position and orientation of the image capturing device. In this way, the position of the dot index is calculated.

Non-patent reference 4 discloses a method of measuring the positions and orientations of a large number of square indices allocated on a 3D space. In non-patent reference 4, a large number of images of the large number of square indices allocated on the 3D space are captured, and the position and orientation of the image capturing device which captured the images, and the positions and orientations of the square indices are calculated by iterative calculations so as to minimize projection errors.

In order to implement the MR and AR, the position and orientation of the image capturing device need to be measured. As one technique for measuring the position and orientation of the image capturing device, a method of capturing an index whose position on the physical space is given by the image capturing device, and using the captured image is known.

However, upon allocating the "index whose position on the physical space is given" on the physical space, its position need to be measured, but that measurement is troublesome. Hence, an "index calibration tool" which calculates the position of this index using a plurality of images obtained by capturing the index allocated on the physical space using a plurality of image capturing devices has been proposed (see non-patent reference 5). Using such index calibration tool, the position of the index on the physical space can be easily measured.

[Patent Reference 1]
Japanese Patent Laid-Open No. 11-084307
[Patent Reference 2]
Japanese Patent Laid-Open No. 2000-041173
[Non-patent Reference 1]
R. M. Haralick, C. Lee, K. Ottenberg, and M. Nolle: "Review and analysis of solutions of the three point perspective pose estimation problem", Int'l. J. Computer Vision, vol. 13, no. 3, pp. 331-356, 1994.
[Non-patent Reference 2]
Kato, M. Billinghurst, Asano, and Tachibana: "An Augmented Reality System and its Calibration based on Marker Tracking", Transactions of the Virtual Reality Society of Japan, vol. 4, no. 4, pp. 607-616, 1999.
[Non-patent Reference 3]
A. State, G. Hirota, D. T. Chen, W. F. Garrett and M. A. Livingston: "Superior augmented reality registration by integrating landmark tracking and magnetic tracking", Proc. SIGGRAPH'96, pp. 429-438, 1996.
[Non-patent Reference 4]
G. Baratoff, A. Neubeck and H. Regenbrecht: "Interactive multi-marker calibration for augmented reality applications", Proc. ISMAR2002, pp. 107-116, 2002.
[Non-patent Reference 5]
D. Kotake, S. Uchiyama, and H. Yamamoto: "A marker calibration method utilizing a priori knowledge on marker arrangement," Proc. 3rd IEEE/ACM Int'l Symp. on Mixed and Augmented Reality (ISMAR 2004), pp. 89-98, November 2004.

With the dot index position measurement method using the aforementioned bundle adjustment method, the accurate position and orientation cannot be calculated unless at least two images are captured per index. In case of a dot index, even if only one image is captured, a straight line where the dot index exists on the physical space is merely determined, and the position of the dot index in the depth direction of the image capturing device becomes indefinite. For this reason, information indicating whether or not minimum required images for the position measurement have been acquired is important.

Upon capturing an image, information indicating whether each individual index is a reference index or an index to be calibrated is important.

As a result of calibration, a specific index cannot often be calibrated. In such case, calculation errors cannot often be eliminated unless an image that disturbs the calculations is removed, and information indicating which image disturbs the calculations is required.

Upon execution of calibration again by adding image data after calibration, information indicating which indices have been calibrated is required.

In case of a polygonal index such as a square index, the index itself has a unique ID. Even when this index is designated in advance as an object to be calibrated, it can be automatically added as an object to be calibrated when it is recognized from an image. However, since the automatically added index may be an index which is not to be added as an object to be calibrated, information indicating whether or not the automatically added index is an index designated in advance is required.

Since errors are distributed to a large number of images with increasing number of images including indices, the position and orientation can be obtained with higher accuracy than a case of a smaller number of images. For this reason, it is desirable to capture an image of an index so as to increase the number of times of capturing of the index whose position and orientation are to be calculated as much as possible. For this reason, information indicating the number of times of capturing of each index need to be presented. However, upon acquisition of images for calibration, various conditions need to be considered, and it is difficult for the operator to judge what to do next by combining these conditions.

In order to efficiently acquire the positions of indices on the physical space using the index calibration tool, all indices need to be evenly captured. For this purpose, position information need to be equally stored for respective indices.

However, in the conventional system, information indicating which index has already been captured is not provided. For this reason, the user need to remember about whether or not each individual index has already been captured upon capturing indices. If the user forgets to capture a given index, the user need to capture that index, and troublesome operations are required to calculate the positions of indices.

SUMMARY OF THE INVENTION

The present invention has been made in consideration of the aforementioned problems, and has as its object to provide a technique for presenting the operation contents to be executed next by the user to the user in an easily recognizable manner upon calculating the position and orientation of an index allocated on a physical space from images obtained by capturing an image of this physical space.

It is another object of the present invention to provide a technique for reducing labor required to calculate the position of an index.

According to the first aspect of the present invention, an image processing apparatus comprises:

an acquisition unit adapted to acquire a captured image from an image capturing device that captures a plurality of images of a physical space on which a plurality of indices are allocated;

a registration unit adapted to acquire, for each index included in the captured image acquired by the acquisition unit, a set of index identification information unique to an interest index, image coordinates of the interest index in the captured image, and image identification information unique to the captured image, which are obtained by applying identification processing to the interest index included in the captured image acquired by the acquisition unit, and to register the acquired set in a memory;

a management unit adapted to manage the numbers of times of previous identification for respective pieces of index identification information of indices that undergo the identification processing by the registration unit;

a display unit adapted to display the number of times managed by the management unit in association with index identification information in the set to be registered, every time the registration unit registers the set; and a calculation unit adapted to calculate, using a set group registered in the memory, positions and orientations of indices corresponding to the set groups.

According to the second aspect of the present invention, an image processing method comprises:

an acquisition step of acquiring a captured image from an image capturing device that captures a plurality of images of a physical space on which a plurality of indices are allocated;

a registration step of acquiring, for each index included in the captured image acquired in the acquisition step, a set of index identification information unique to an interest index, image coordinates of the interest index in the captured image, and image identification information unique to the captured image, which are obtained by applying identification processing to the interest index included in the captured image acquired in the acquisition step, and registering the acquired set in a memory;

a management step of managing the numbers of times of previous identification for respective pieces of index identification information of indices that undergo the identification processing in the registration step;

a display step of displaying the number of times managed in the management step in association with index identification information in the set to be registered, every time the set is registered in the registration step; and a calculation step of calculating, using a set group registered in the memory, positions and orientations of indices corresponding to the set groups.

Further features of the present invention will become apparent from the following description of exemplary embodiments with reference to the attached drawings.

BRIEF DESCRIPTION OF THE DRAWINGS

FIG. 5 shows an example of the configuration of an index management table;

FIG. 6 shows an example of the index management table which has been updated in step S4110;

FIG. 10 shows a display example in a display area 705;

DESCRIPTION OF THE EMBODIMENTS

Preferred embodiments of the present invention will be described in detail hereinafter with reference to the accompanying drawings. Note that these embodiments will be described as examples of preferred arrangements of the invention described in the scope of claims, and such invention is not limited to the embodiments to be described hereinafter.

First Embodiment

Figure 1:
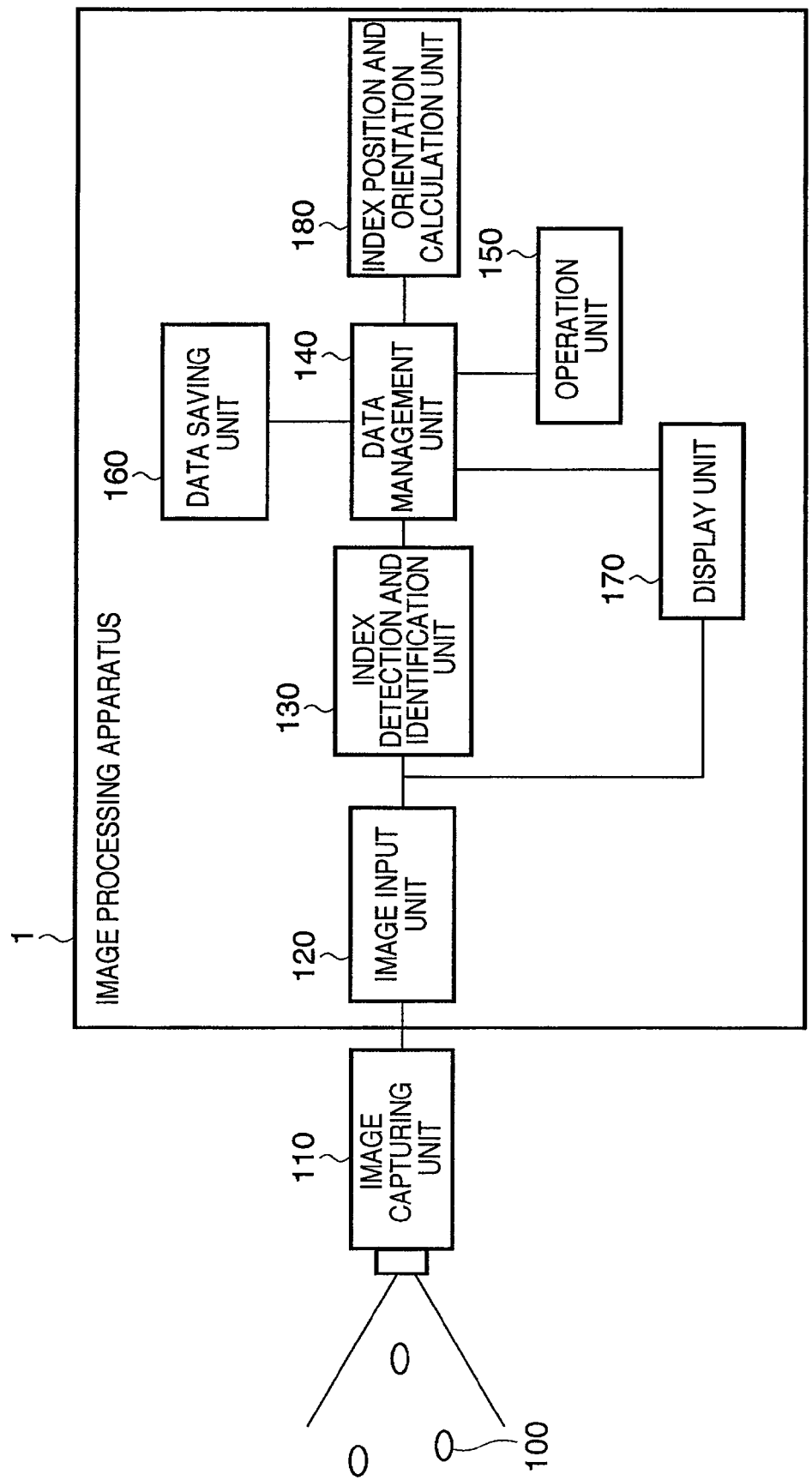
FIG. 1 is a block diagram showing the functional arrangement of a system according to the first embodiment of the present invention, which is used to calculate the positions and orientations of indices allocated on a physical space.

FIG. 1 is a block diagram showing the functional arrangement of a system according to this embodiment, which is used to calculate the positions and orientations of indices allocated on a physical space. As shown in FIG. 1, a system according to this embodiment comprises an image capturing unit 110 and image processing apparatus 1.

The image capturing unit 110 will be described first. The image capturing unit 110 is a device which captures a plurality of images of a physical space on which a plurality of indices 100 are allocated, and is, for example, a video camera which captures a movie of the physical space. Images (physical space images or captured images) of respective frames captured by the image capturing unit 110 are sequentially input to the subsequent image processing apparatus 1.

The image processing apparatus 1 will be described below. As shown in FIG. 1, the image processing apparatus 1 comprises an image input unit 120, index detection and identification unit 130, data management unit 140, operation unit 150, data saving unit 160, display unit 170, and index position and orientation calculation unit 180.

Upon receiving the captured images sequentially output from the image capturing unit 110, the image input unit 120 outputs these images to the subsequent index detection and identification unit 130 and display unit 170 in the order they are received. As a result, the display unit 170 displays a movie of the physical space captured by the image capturing unit 110 on its display screen.

When the image received from the image input unit 120 includes an index, the index detection and identification unit 130 identifies this index, and outputs data of the identification result to the subsequent data management unit 140.

The data management unit 140 manages data of the identification result received from the index detection and identification unit 130. Upon detection of an "image save" instruction input by the user using the operation unit 150, the data management unit 140 registers the data of the identification result received from the index detection and identification unit 130 in the data saving unit 160.

The data management unit 140 compares the data of the latest identification result received from the index detection and identification unit 130 with that which has already been registered in the data saving unit 160, and outputs information about the index which was identified a plurality of times previously to the display unit 170. This processing will be described in detail later.

Upon detection of an "index position and orientation calculation" instruction input by the user using the operation unit 150, the data management unit 140 reads out data of the identification results from the data saving unit 160 and outputs them to the index position and orientation calculation unit 180.

The index position and orientation calculation unit 180 calculates the position and orientation of the index using the data of the identification results received from the data management unit 140.

Note that FIG. 1 does not particularly show the output destination of data of the position and orientation of the index calculated by the index position and orientation calculation unit 180. This output destination is not shown since it is not the gist of the invention. However, in general, since the use method of data of the position and orientation of an index calculated from the captured images is known to those who are skilled in the art, a description and illustration thereof will not be made.

Figure 2A:
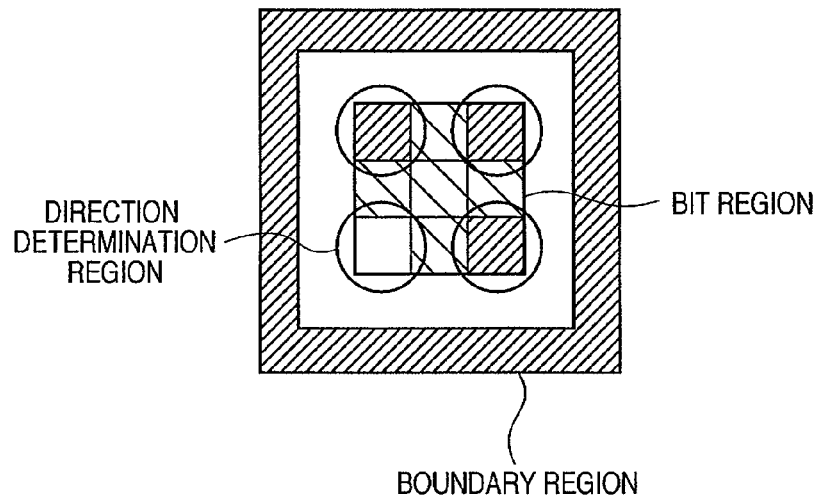
FIGS. 2A and 2B are views for explaining an index used in the first embodiment of the present invention.
Figure 2B:
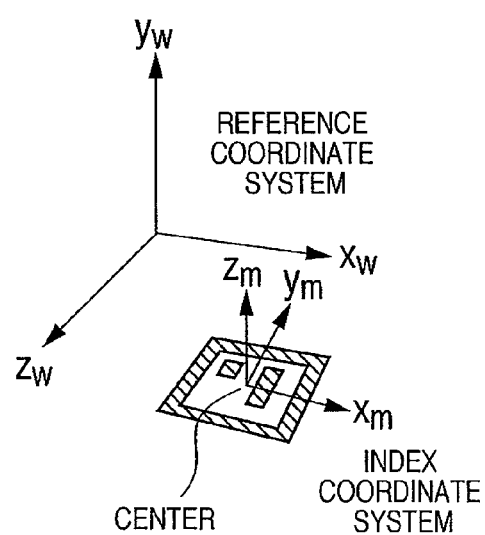

The index used in this embodiment will be described below. FIGS. 2A and 2B are views for explaining an index used in this embodiment. This embodiment adopts a square-shaped index (to be referred to as a square index hereinafter) shown in FIG. 2A as an object, the position and orientation of which are to be calculated. As shown in FIG. 2A, the square index is defined by a boundary region (black frame) indicating an index region, and an internal region. The height and width of the internal region are respectively divided into five equal parts, and an inner 3×3 region indicates the direction and unique identifier (identification information) of the square index. The four corners (regions bounded in circles in FIG. 2A) of the 3×3 region are regions (direction determination regions) indicating the direction of the square index. Three out of the four corners are painted in black, and the remaining one corner is painted in white. This pattern represents the direction of the square region. The identifier of the square index is expressed by five regions (bit regions; hatched regions in FIG. 2A) except for the four corners of the 3×3 region. Each of the five regions represents 0 when it is painted in white or 1 when it is painted in black. Thus, the five regions can express 5 bits, i.e., 32 different identifiers.

FIG. 2B is a view for explaining the allocation information of the square index. The allocation information of the square index is expressed by the position and orientation with respect to the reference coordinate system. In this embodiment, the position of the square index is specified by that of the center (an intersection of diagonal lines) of a square, and is expressed by a 3D vector $t_{wm}$ with respect to the reference coordinate system. Assume that the orientation of the square index is that of a coordinate system of the square index (index coordinate system) with respect to the reference coordinate system, as shown in FIG. 2B. Since the orientation has a degree of freedom of 3, it is expressed by a 3D vector $\omega_{wm}$.

Note that the reference coordinate system defines one point on the physical space as an origin, and three axes which are orthogonal to each other at that origin as x-, y-, and z-axes. The index coordinate system defines, for example, the center of the square index as an origin, a direction along one side of the square index as an x-axis, a direction along a side which neighbors that side as a y-axis, and a normal direction to the square index as a z-axis.

The operation of the system according to this embodiment will be described in more detail below.

The image capturing unit 110 captures a plurality of images of the physical space on which a plurality of indices 100 (square indices) are allocated irrespective of user's operations, as described above. In the following description, assume that the image capturing unit 110 is a video camera which captures a movie. Captured images of respective frames captured by the image capturing unit 110 are input to the image input unit 120.

The image input unit 120 transfers the captured images sequentially output from the image capturing unit 110 to the display unit 170 intact. As a result, the display unit 170 displays, on its display screen, the captured images captured by the image capturing unit 110, i.e., a movie of the physical space on which the plurality of indices 100 are allocated. Therefore, the user can move the position and orientation of the image capturing unit 110, so that the image capturing unit 110 captures an index 100 as an object whose position and orientation are to be calculated, while confirming the movie displayed on the display screen of the display unit 170.

On the other hand, the image input unit 120 also outputs the captured images of respective frames received from the image capturing unit 110 to the index detection and identification unit 130.

When the captured image received from the image input unit 120 includes the index 100, the index detection and identification unit 130 executes processing for identifying that index 100, as described above. In order to detect the index 100 as a square index from the captured image, the index detection and identification unit 130 binarizes the captured image and labels coupled regions to extract the internal region bounded by the black frame as the boundary region of the square index. Furthermore, the index detection and identification unit 130 applies line fitting to the internal region of the square index to calculate the image coordinates of the four vertices of a square in the internal region. Then, the index detection and identification unit 130 transforms the square index on the captured image into an orthogonally projected image by two-dimensional projective transformation, and reads the direction determination regions and bit regions, thereby reading out and identifying the identifier of the square index. Note that the identification method of the index 100 may change depending on the type of the index 100 to be used, as needed. Thus, the identification method of the index 100 may correspond according to the index 100.

When the captured image includes the index 100, the index detection and identification unit 130 acquires a set (extracted index set) of the frame number of the captured image as an extraction source of the index 100, the identifier of the index 100, and the image coordinates of the four corners of the internal region of the index 100 for that index 100. This extracted index set is acquired for respective indices 100 (for respective indices) in the captured image. As the frame number, a count value which is counted every time the image input unit 120 inputs the captured image of each frame may be used. Of course, the present invention is not limited to the frame number, and any other kinds of image identification information may be used as long as they can uniquely specify the captured image of each frame.

The index detection and identification unit 130 outputs the extracted index sets for respective indices 100 included in the captured image to the subsequent data management unit 140.

Upon detection of an "image save" instruction input by the user using the operation unit 150, the data management unit 140 registers the extracted index sets for respective indices 100 detected by the index detection and identification unit 130 from the captured image in the data saving unit 160. That is, every time the "image save" instruction is input, the set of "the frame number of the captured image as an extraction source of the index 100, the identifier of the index 100, and the image coordinates of the four corners of the internal region of the index 100" is registered in the data saving unit 160.

Upon execution of such registration processing, an index management table shown in, e.g., FIG. 5 is also generated in the data saving unit 160. FIG. 5 shows an example of the configuration of the index management table. In the index management table, the number of times of detection from the captured images, information indicating whether the corresponding extracted index set is obtained by identifying the index 100 from the image or is manually input by the user, information indicating whether or not the position and orientation of the index 100 have already been calculated, and the like are registered in correspondence with each index 100.

In FIG. 5, in the column of "index ID", the identifier of the index is registered. In the column of "input type", information indicating whether the index of the corresponding identifier (the index with the identifier registered in the same row) is obtained from the captured image (automatic detection) or is manually registered by the user (user defined) is registered. In the column of "capturing count (the number of times of capturing)", the number of times of previous detection of the index of the corresponding identifier from the captured images is registered. In the column of "calibration state", information indicating whether or not the position and orientation of the index of the corresponding identifier have already been calculated is registered.

For example, in FIG. 5, an extracted index set for an index with an index ID (identifier)=1 is manually registered by the user in the data saving unit 160, and this index was previously detected twice from the captured images and is a reference index, whose position and orientation are given.

That is, upon registering a certain extracted index set (extracted index set of interest) in the data saving unit 160, first, the data management unit 140 checks if an extracted index set including the same identifier as that in the extracted index set of interest has already been registered in the index management table. As a result of such checking, if no extracted index set is registered, the data management unit 140 registers the identifier in the extracted index set of interest in the last row of "index ID", "automatically detected" in the last row of "input type", "1" in the last row of "capturing count", and "not estimated" in the last row of "calibration state". On the other hand, as a result of checking, if such extracted index set has already been registered, the data management unit 140 adds "1" to a numeric value in the column of "capturing count" in the row where the identifier in the extracted index set of interest is registered. If the sum becomes equal to or larger than a pre-set value (e.g., 2), the data management unit 140 executes processing for calculating the position and orientation of the image capturing unit 110 using that index, and registers "approximate values calculated" in the corresponding column of "calibration state".

Upon registering the extracted index set of interest in the data saving unit 160, if an extracted index set including the same identifier as that in the extracted index set of interest has already been registered in the index management table, the data management unit 140 executes the following processing. That is, the data management unit 140 outputs information registered in the index management table shown in FIG. 5 in association with the extracted index set of interest to the display unit 170. For example, if the identifier=13 in the extracted index set of interest, the data management unit 140 additionally displays "input type"="automatically detected", "capturing count"="4", and "calibration state"="approximate values calculated" corresponding to the index ID=13 on the display screen of the display unit 170.

If the user determines that images which suffice to calculate the positions and orientations of the indices 100 have been captured (for example, the numbers of times of capturing for all indices displayed on the display screen of the display unit 170 are 2 or more), the user inputs an "index position and orientation calculation" instruction using the operation unit 150.

Upon detection of input of such instruction, the data management unit 140 reads out the extracted index sets corresponding to the respective identifiers registered in the index management table from the data saving unit 160, and outputs them to the index position and orientation calculation unit 180.

The index position and orientation calculation unit 180 calculates the positions and orientations of the respective indices 100 on the reference coordinate system using the received extracted index sets. The calculation method will be described later.

Figure 4:
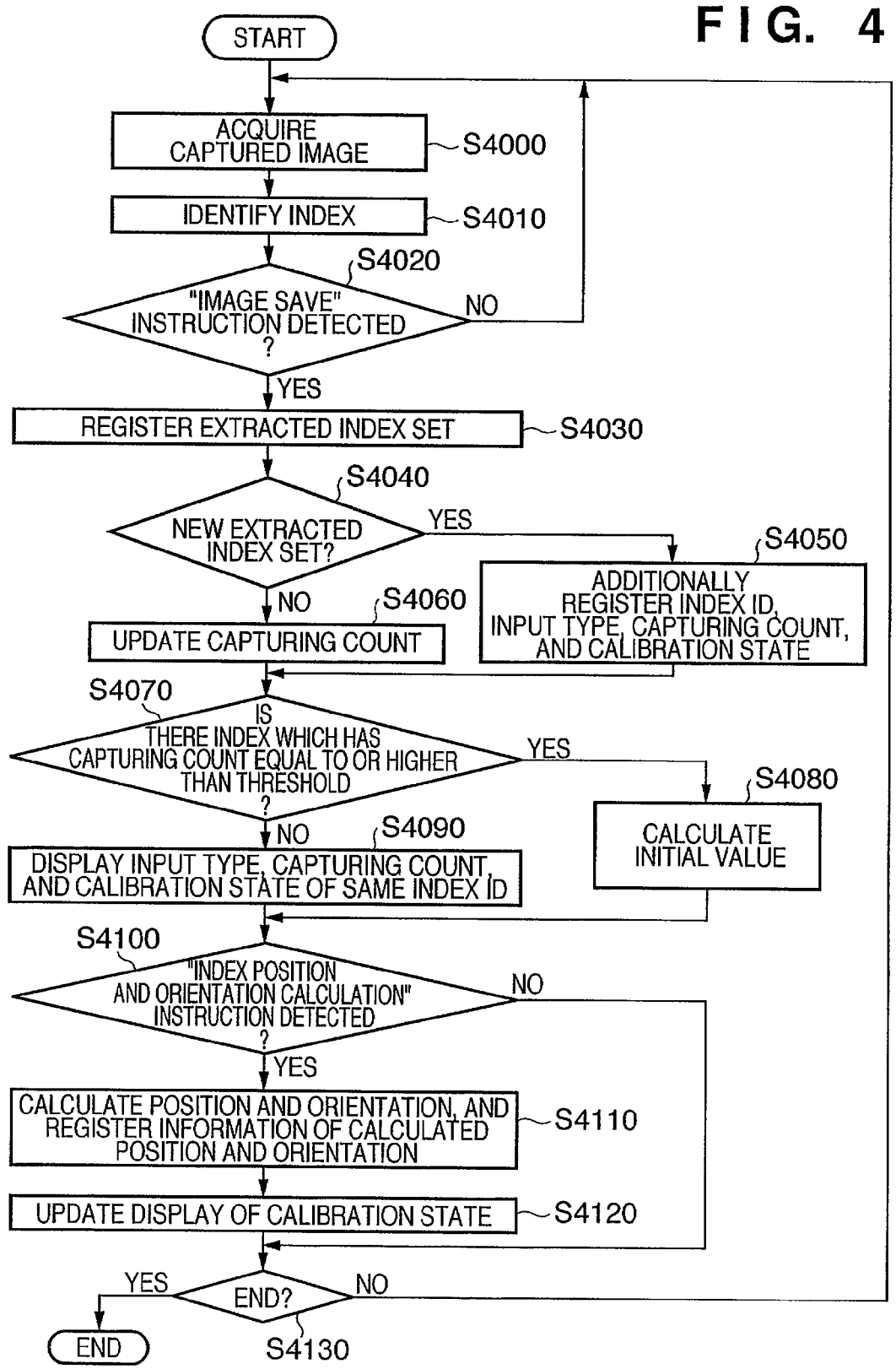
FIG. 4 is a flowchart of processing executed when the image processing apparatus 1 calculates the positions and orientations of indices 100 on a reference coordinate system.

FIG. 4 is a flowchart of processing executed when the image processing apparatus 1 calculates the positions and orientations of the indices 100 on the reference coordinate system.

In step S4000, the image input unit 120 transfers captured images sequentially output from the image capturing unit 110 to the display unit 170 intact, and also outputs them to the index detection and identification unit 130.

If the captured image received from the image input unit 120 includes the index 100, the index detection and identification unit 130 executes processing for identifying that index 100 in step S4010, as described above. The index detection and identification unit 130 acquires a set (extracted index set) of the frame number of the captured image as an extraction source of the index 100, the identifier of the index 100, and the image coordinates of the four corners of the internal region of the index 100 in association with that index 100. The index detection and identification unit 130 outputs the extracted index set for each index 100 included in the captured image to the subsequent data management unit 140.

The data management unit 140 checks in step S4020 if the user has input an "image save" instruction using the operation unit 150. As a result of this checking, if the user has not input such instruction yet, the process returns to step S4000. On the other hand, if the user has input that instruction, the process advances to step S4030.

In step S4030, the data management unit 140 registers each extracted index set received from the index detection and identification unit 130 in the data saving unit 160.

The data management unit 140 checks in step S4040 if an extracted index set including the same identifier as that in the extracted index set (extracted index set of interest) registered in step S4030 has already been registered in the index management table. As a result of this checking, if such set has not been registered yet, the process advances to step S4050.

In step S4050, the data management unit 140 registers the identifier in the extracted index set of interest in the last row of "index ID", "automatically detected" in the last row of "input type", "1" in the last row of "capturing count", and "not estimated" in the last row of "calibration state". On the other hand, as a result of checking, if the set has already been registered, the process advances to step S4060.

In step S4060, the data management unit 140 adds "1" to a numeric value in the column of "capturing count" in the row where the identifier in the extracted index set of interest is registered.

The data management unit 140 checks in step S4070 if there is an index whose "capturing count" is equal to or larger than a pre-set threshold (e.g., 2). As a result of this checking, if the index whose "capturing count" is equal to or larger than the pre-set threshold (e.g., 2) is detected, the process advances to step S4080; otherwise, the process advances to step S4090.

In step S4080, the initial values of the position and orientation of the image capturing unit 110 are calculated by a known method such as a DLT (Direct Linear Transform) method or the like using the captured image including the index whose position and orientation on the reference coordinate system are given. Then, "calibration state" corresponding to the index 100 whose existence was confirmed in step S4070 is changed to "approximate values calculated". Note that a six-degree-of-freedom position and orientation sensor such as a magnetic sensor, optical sensor, ultrasonic sensor, or the like may be mounted on the image capturing unit 110 in order to acquire the initial values of the position and orientation of the image capturing unit 110 from the measured values of the sensor.

In step S4090, the data management unit 140 outputs "input type", "capturing count", and "calibration state" of the extracted index set including the same identifier as that in the extracted index set (extracted index set of interest) registered in step S4030 to the display unit 170. As a result, the display unit 170 displays the output "input type", "capturing count", and "calibration state" on its display screen. Note that "capturing count" also indicates the number of sets including the same identifier as that of the extracted index set of interest of those which have already registered in the data saving unit 160 upon registering the extracted index set of interest.

The data management unit 140 checks in step S4100 if the user has input an "index position and orientation calculation" instruction using the operation unit 150. As a result of this checking, if the user has not input such instruction, the process jumps to step S4130; otherwise, the process advances to step S4110.

In step S4110, the data management unit 140 reads out the extracted index sets of the indices corresponding to the identifiers registered in the index management table from the data saving unit 160, and outputs them to the index position and orientation calculation unit 180. The index position and orientation calculation unit 180 calculates the positions of orientations of the indices 100 on the reference coordinate system using the received extracted index sets.

Details of the processing in step S4110 will be described below.

Let N be the number of indices, the position and orientation of which are to be calculated, and M be the number of captured images. M can be a maximum number of image numbers in the extracted index sets saved in the data saving unit 160. Also, let ai be a six-dimensional vector that represents the position and orientation of an index i (i=1, 2, ..., N), and sj be a six-dimensional vector that represents the position and orientation of the image capturing unit 110 that captured an image j (j=1, 2, ..., M). The six-dimensional vector a which represents the position and orientation of each index includes components of a position $t_{wm}=[t_{wm}{}^x t_{wm}{}^y t_{wm}{}^z]^t$ of the index on the reference coordinate system, and its orientation $\omega_{wm}=[\omega_{wm}{}^x \omega_{wm}{}^y \omega_{wm}{}^z]^t$ with respect to the reference coordinate system, and can be expressed by $a=[t_{wm}{}^x t_{wm}{}^y t_{wm}{}^z \omega_{wm}{}^x \omega_{wm}{}^y \omega_{wm}{}^z]^t$. If the position of the image capturing unit 110 on the reference coordinate system is expressed by $t_{wc}=[t_{wc}{}^x t_{wc}{}^y t_{wc}{}^z]^t$, and the orientation with respect to the reference coordinate system is expressed by $\omega_{wc}=[\omega_{wc}{}^x \omega_{wc}{}^y \omega_{wc}{}^z]^t$, a six-dimensional vector s that represents the position and orientation of the image capturing unit 110 can be expressed by $s=[t_{wc}{}^x t_{wc}{}^y t_{wc}{}^z \omega_{wc}{}^x \omega_{wc}{}^y \omega_{wc}{}^z]^t$.

Letting e be the length of one side of the square, coordinates $x_m{}^k=[x_m{}^k\ y_m{}^k\ z_m{}^k]^t$ (k=1, 2, 3, and 4) of respective vertices on the index coordinate system of the square index can be expressed by:

$$x_m^1 = \begin{bmatrix} -\frac{e}{2} & -\frac{e}{2} & 0 \end{bmatrix}^t \quad (1)$$

$$x_m^2 = \begin{bmatrix} \frac{e}{2} & -\frac{e}{2} & 0 \end{bmatrix}^t$$

$$x_m^3 = \begin{bmatrix} \frac{e}{2} & \frac{e}{2} & 0 \end{bmatrix}^t,$$

$$x_m^4 = \begin{bmatrix} -\frac{e}{2} & \frac{e}{2} & 0 \end{bmatrix}^t$$

If the length of one side of the square is known, these coordinate values are given.

Assume that a vertex, of an index, has index coordinates $x_m$ on the index that has the position and orientation $t_{wm}$ and $\omega_{wm}$ with respect to the reference coordinate system. In this case, camera coordinates $x_c$, of the vertex, on the image capturing unit 110 which has the position and orientation $t_{wc}$ and $\omega_{wc}$ with respect to the reference coordinate system, can be expressed by:

$$x_c = R(\omega_{wc})^{-1} \cdot (R(\omega_{wm}) \cdot x_m + t_{wm} - t_{wc}) \quad (2)$$

where $R(\omega_{wc})$ and $R(\omega_{wm})$ are 3×3 rotation transformation matrices which respectively express the orientations $\omega_{wc}$ and $\omega_{wm}$. A position $u=[u_x\ u_y]^t$ of a point which has camera coordinates $Xc=[xc\ yc\ zc]^t$ and is projected on an image by a pinhole camera (the image capturing unit 110 in this embodiment) having a focal length f can be expressed by:

$$u_x = -f \frac{x_c}{z_c}, \quad u_y = -f \frac{y_c}{z_c} \quad (3)$$

That is, u is a function of the position $t_{wm}$ and orientation $\omega_{wm}$ of the index and the position $t_{wc}$ and orientation $\omega_{wc}$ of the image capturing unit 110. Hence, a two-dimensional (2D) vector $u_{i,j,k}$ that represents the position of a projected image of each vertex k (k=1, 2, 3, and 4) of the index i on the image j is a function of $a_i$ and $s_j$, as described by:

$$u_{i,j,k} = F(a_i, s_j) \quad (4)$$

Let $\bar{u}_{i,j,k}$ be the observation position, on an actual image, of the projected image of each vertex k of the index i on the image j. Then, the linear approximation of an error $\Delta u_{i,j,k}$ (= $\bar{u}_{i,j,k} - u_{i,j,k}$) between the observation position $\bar{u}_{i,j,k}$ and $u_{i,j,k}$ calculated from $a_i$ and $s_j$ can be expressed by:

$$\Delta u_{i,j,k} \approx \begin{bmatrix} \frac{\partial u_{i,j,k}}{\partial a_i} & \frac{\partial u_{i,j,k}}{\partial s_j} \end{bmatrix} \begin{bmatrix} \Delta a_i \\ \Delta s_j \end{bmatrix} \quad (5)$$

where $\partial u_{i,j,k}/\partial a_i$ and $\partial u_{i,j,k}/\partial s_j$ are Jacobian matrices obtained by partial derivative coefficients respectively obtained when $u_{i,j,k}$ is partially differentiated by components of $a_i$ and $s_j$ in equation (4).

Equation (5) is applied to the respective vertices of respective indices detected and identified in respective images, and a simultaneous equation is solved to have, as common unknown variables, all $\Delta a_i$ (i=1, 2, ..., N) and $\Delta s_j$ (j=1, 2, ..., M), thus obtaining $\Delta a_i$ (i=1, 2, ..., N) and $\Delta s_j$ (j=1, 2, ..., M). Initial values are given to $a_i$ and $s_j$ in advance, and an operation for calculating $\Delta a_i$ (i=1, 2, ..., N) and $\Delta s_j$ (j=1, 2, ..., M), and making corrections given by $a_i=a_i+\Delta a_i$ and $s_j=s_j+\Delta s_j$ is repeated, thus calculating the positions and orientations $a_i$ (i=1, 2, ..., N) of the indices.

Then, each information indicating the position and orientation (position and orientation information) is registered in the data saving unit 160. In this case, "calibration state" of the index whose position and orientation are calculated is updated to "optimization calculations done" in the index management table. FIG. 6 shows an example of the index management table which has been updated in step S4110.

In step S4120, "calibration state" of each index whose position and orientation are calculated of those currently displayed on the display screen of the display unit 170 is updated to "optimization calculations done". Note that "error" is registered in "calibration state" for an index whose position and orientation cannot be calculated due to non-convergence of the calculation result, a recognition error of the index, and the like in the aforementioned calculation processing.

The data management unit 140 checks in step S4130 if the user has input a processing end instruction using the operation unit 150. As a result of this checking if the user has not input such instruction, the process returns to step S4000; otherwise, this processing ends.

As described above, according to this embodiment, the user can confirm, for each individual index detected on the captured image, the states such as whether or not the position and orientation have been calculated, how many times the index was captured so far, whether or not the index can be used for the position and orientation calculations, and so forth. As a result, the user can recognize the start timing of the processing for calculating the positions and orientations of the respective indices, the indices whose positions and orientations have not been calculated yet, and the like. Therefore, the positions and orientations of all the indices can be calculated with higher accuracy.

<Modification 1>

The indices 100 may be displayed on the display screen of the display unit 170 so as to have colors corresponding to the numbers of times of previous identification. For example, in order to notify the user that the indices 100 corresponding to the number of times equal to or larger than "2" can undergo the position and orientation calculations, indices 100 of "2" or more are displayed in red, and indices 100 less than "2" are displayed in white.

Of course, the display mode of the indices 100 is not limited to this, but various modes may be used. For example, only the outer frame of each square index is rendered to have a different color, and the entire internal region need not to be painted. In place of changing the color, the transparency of an index which has the number of times of previous identification equal to or higher than a threshold may be increased, and that of an index less than the threshold may be decreased, or vice versa. Furthermore, no information may be presented for an index which has the number of times of previous identification equal to or higher than the threshold, and information may be presented for only an index less than the threshold, or vice versa. Such information is not particularly limited, and for example, "input type", "capturing count", and "calibration state" may be displayed.

Also, the same control may be applied to the text color and transparency upon displaying "capturing count".

In place of the number of times of previous identification, the user may be notified of the remaining number of times of identification required to use the corresponding index as an object whose position and orientation are to be calculated.

<Modification 2>

As the index 100, an index of another type, for example, a dot-shaped index, may be used in place of the square index. In this case, the identification method of an index is varied depending on the type of index. Note that index identification according to the type of index can be implemented by a state-of-the-art technique.

<Modification 3>

In the above description, if the user instruction is detected in step S4100, the processing for calculating the position and orientation of an index is started. However, if all the numbers of times of capturing currently registered in the index management table are equal to or higher than a threshold (e.g., "2"), the processes in step S4100 and subsequent steps may be started without accepting any user instruction. In this case, it is checked in step S4100 if all the numbers of times of capturing currently registered in the index management table are equal to or higher than the threshold. If all the numbers of times of capturing are equal to or higher than the threshold, the process advances to step S4110; otherwise, the process jumps to step S4130.

Second Embodiment

In the above description, the respective units which configure the image processing apparatus 1 shown in FIG. 1 are implemented by hardware in the first embodiment. However, some of these units may be implemented by software. In such case, this software is executed on a computer such as a PC (personal computer) or the like, and this computer executes the processes described as those to be implemented by the image processing apparatus 1.

Figure 3:
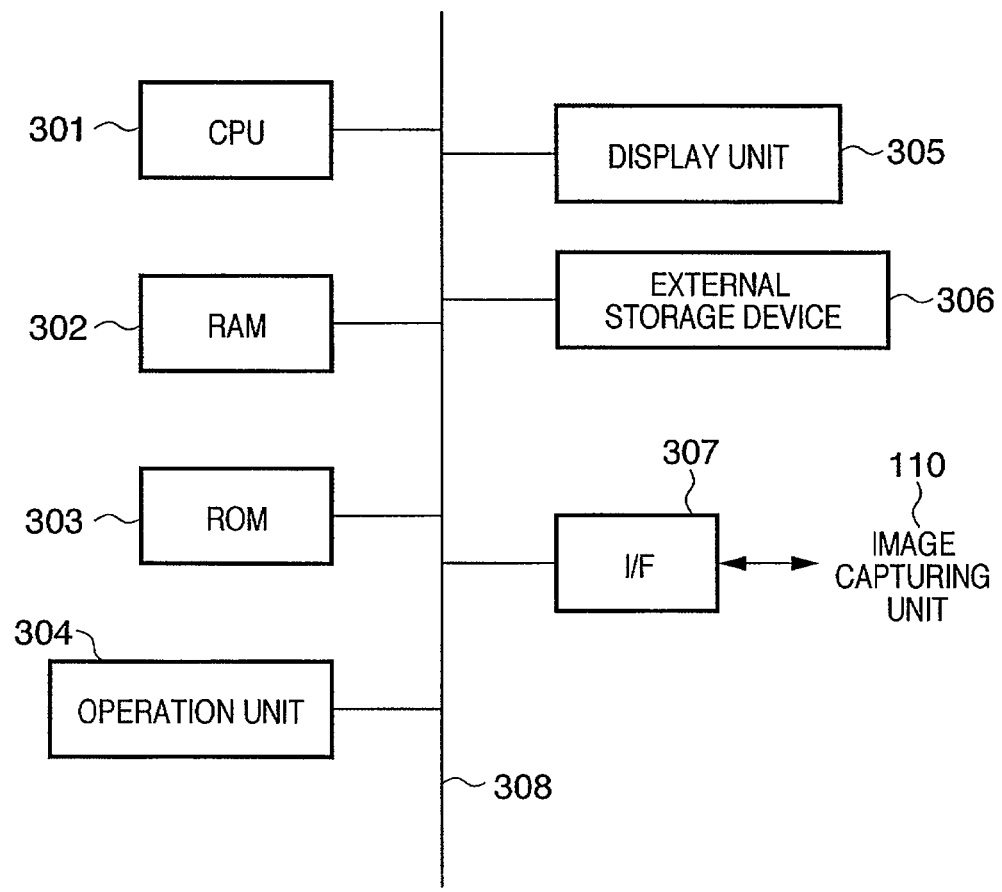
FIG. 3 is a block diagram showing an example of the hardware arrangement of a computer which is applicable to an image processing apparatus 1.

FIG. 3 is a block diagram showing an example of the hardware arrangement of a computer which is applicable to the image processing apparatus 1.

A CPU 301 controls the overall computer using programs (computer programs) and data stored in a RAM 302 and ROM 303, and executes the processes described as those to be implemented by the image processing apparatus 1.

The RAM 302 has an area for temporarily storing programs and data loaded from an external storage device 306, and data of captured images of respective frames received from the image capturing unit 110 via an I/F (interface) 307. Furthermore, the RAM 302 comprises a work area used when the CPU 301 executes various processes. That is, the RAM 302 can provide various areas as needed.

The ROM 303 stores a boot program, setting data, and the like of the computer.

An operation unit 304 serves as the operation unit 150, and comprises a keyboard, mouse, and the like. The operator of this computer can input various instructions to the CPU 301 using this operation unit 304.

A display unit 305 serves as the display unit 170, and comprises a CRT, liquid crystal display, or the like. The display unit 305 can display the processing results of the CPU 301 by means of images, characters, and the like.

The external storage device 306 is a large-capacity information storage device represented by a hard disk drive, and serves as the data saving unit 160. The external storage device 306 saves an OS (operating system), and programs and data for making the CPU 301 execute the respective processes to be implemented by the image processing apparatus 1. The external storage device 306 also saves pieces of given information described in the above embodiments. The programs and data saved in the external storage device 306 are loaded onto the RAM 302 under the control of the CPU 301 as needed, and are to be processed by the CPU 301.

The I/F 307 serves as an interface for connecting the image capturing unit 110 to this computer. Data of captured images of respective frames captured by the image capturing unit 110 are output to the RAM 302 and external storage device 306 via this I/F 307.

Reference numeral 308 denotes a bus which interconnects the aforementioned units.

Third Embodiment

This embodiment will explain a tool (marker calibration tool) used to calculate, from a captured image including an index, the position of that index on a reference coordinate system (world coordinate system), as described in the first embodiment. In this embodiment, each index will be referred to as a marker.

Figure 7:
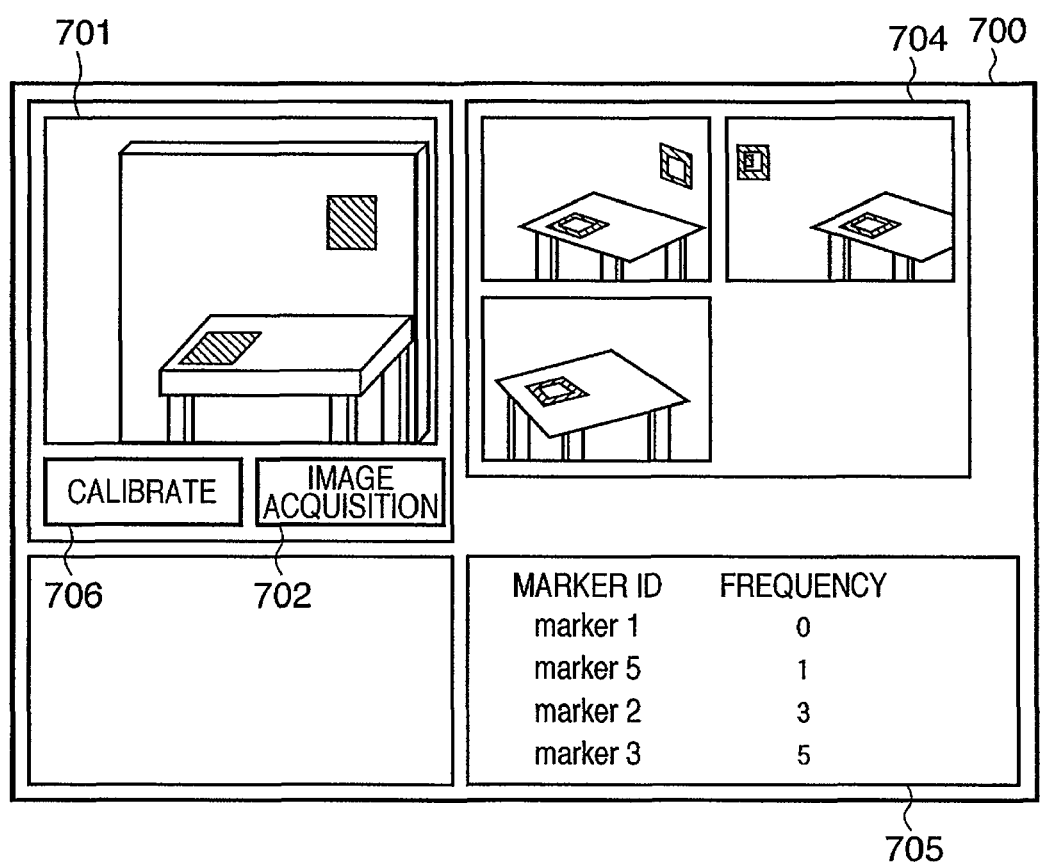
FIG. 7 shows a display example of a GUI (Graphical User Interface) of a marker calibration tool.
Figure 8:
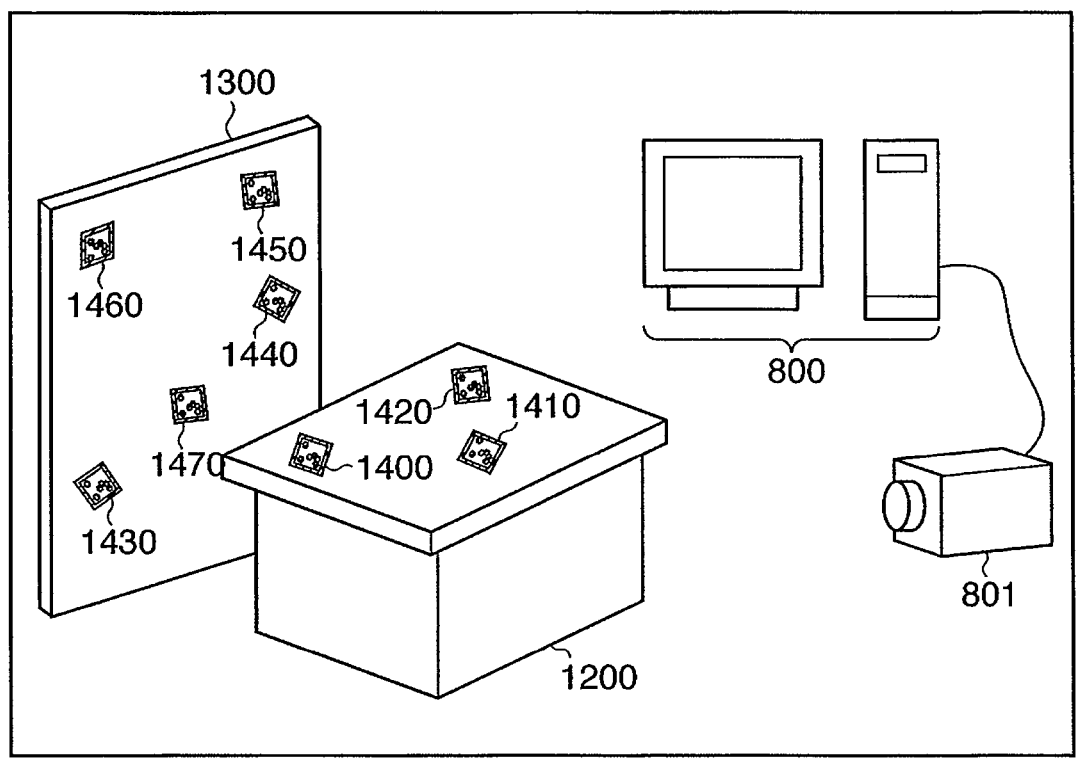
FIG. 8 shows an example of a system according to the third embodiment of the present invention, and an environment in which the system is equipped.

FIG. 7 shows a display example of a GUI (Graphical User Interface) of a marker calibration tool. FIG. 8 shows an example of a system according to this embodiment, and an environment in which the system is equipped.

The marker calibration tool used in this embodiment runs on a computer system 800, to which an image capturing device 801 that captures a movie of the physical space is connected. Data of images (captured images) of respective frames captured by the image capturing device 801 are sequentially input to the computer system 800. In the description of this embodiment, the computer with the hardware arrangement shown in FIG. 3 is used as the computer system 800.

Therefore, in the following description, assume that the programs and data for making the CPU 301 execute the processes described as those to be implemented by the computer system 800 are saved in the external storage device 306. These programs and data are loaded onto the RAM 302 under the control of the CPU 301 as needed, and are to be processed by the CPU 301.

Markers 1400 to 1470 are adhered to a desk 1200 and wall 1300. The image capturing device 801 captures a movie of the physical space including these markers 1400 to 1470, and outputs data of captured images of the captured frames to the computer system 800. Assume that the position of the marker 1400 on the reference coordinate system is given in this embodiment.

The GUI exemplified in FIG. 7 will be described below. Referring to FIG. 7, reference numeral 700 denotes a window of the GUI, and the window 700 includes the following display area and button icons.

Reference numeral 701 denotes a preview display area used to display captured images of respective frames output from the image capturing device 801. When the user who observes the preview display area 701 designates a button icon 702 using the operation unit 304 or the like, the CPU 301 registers, in the external storage device 306, a captured image acquired from the image capturing device 801 at the detection timing of that designation. When the captured image to be registered includes a marker, the CPU 301 executes identification processing of that marker. Furthermore, the CPU 301 generates a thumbnail image of the captured image to be registered, and additionally displays it in an area 704.

Figure 9:
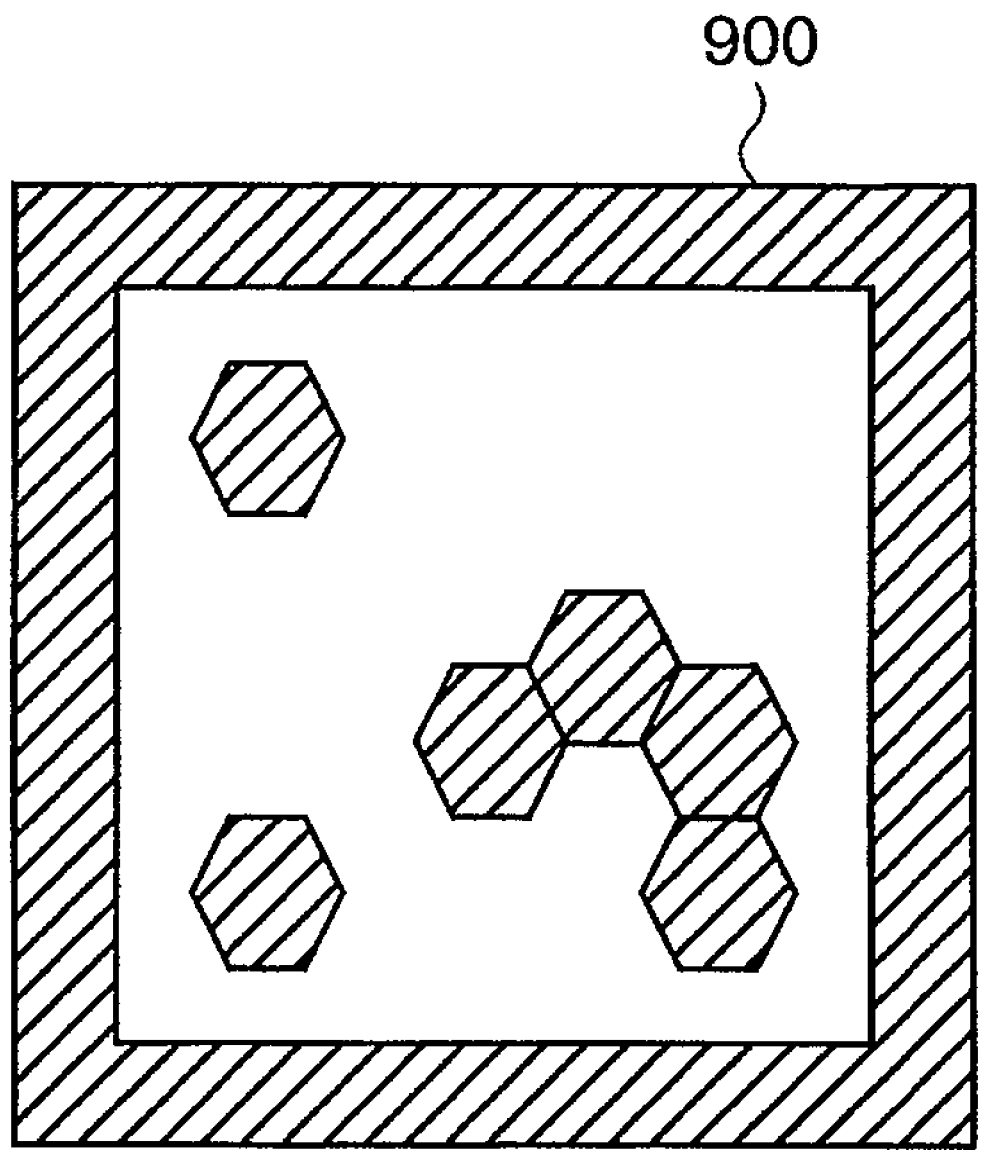
FIG. 9 shows an example of a marker (markers 1400 to 1470) used in the third embodiment of the present invention.

FIG. 9 shows an example of the marker (markers 1400 to 1470) used in this embodiment. As shown in FIG. 9, the marker used in this embodiment has a 2D barcode described in a frame region, as in the first embodiment. This 2D barcode is generated by encoding an identifier (an example of index identification information) unique to the marker. Therefore, by reading this 2D barcode from the image that includes the marker and decoding it, that marker can be specified as one of the markers 1400 to 1470.

Note that a technique for detecting a marker with a 2D barcode from the captured image is a state-of-the-art technique, as described in, e.g., "Hirokazu Kato, Mark Billinghurst, Kouichi Asano, and Keihachiro Tachibana Augmented reality system and its calibration based on marker tracking, Transactions of the Virtual Reality Society of Japan, vol. 4, no. 4, pp. 607-616 (1999)".

Note that the external storage device 306 holds the numbers of times of detection (frequencies) for respective identifiers (for respective pieces of index identification information) of the markers which were previously detected and identified from captured images. That is, the external storage device 306 holds sets of the identifiers of the markers and the numbers of times of previous detection of the markers with these identifiers from the captured images for respective identifiers.

Therefore, upon execution of marker identification processing, it is checked if the identifier (identifier of interest) specified by that identification processing has already registered in the external storage device 306. As a result of this checking, if the identifier of interest has not been registered yet, since this marker is detected from the captured image for the first time, a set of the identifier (identifier of interest) of this marker, and the number of times of detection=1 is registered in the external storage device 306. On the other hand, if that identifier has been registered, the number of times of detection registered in the external storage device 306 as the set with the identifier of interest is incremented by 1.

As for the identified marker, other kinds of information obtained by the identification processing (for example, information unique to the captured image from which the marker is detected, the detected image coordinates, and the like) are also registered in the external storage device 306.

The CPU 301 displays, in a display area 705, the sets which are registered in the external storage device 306 and are sorted in ascending order of number of times of detection.

Figure 12:
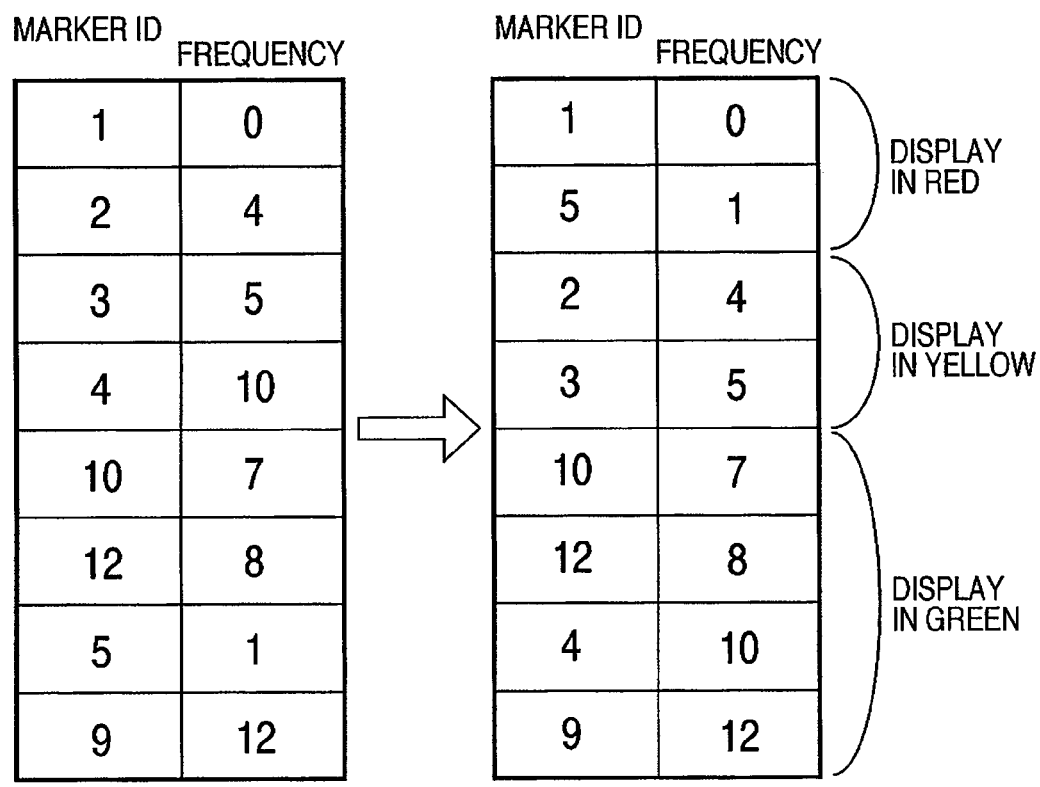
FIG. 12 shows a state in which respective sets registered in an external storage device 306 are sorted in ascending order of number of times of detection.

FIG. 12 shows a state in which respective sets registered in the external storage device 306 are sorted in ascending order of number of times of detection. For example, when the sets are registered in the external storage device 306, as shown in the left side of FIG. 12, these sets are sorted in ascending order of number of times of detection, as shown in the right side of FIG. 12.

FIG. 10 shows a display example in the display area 705. As shown in FIG. 10, respective marker IDs are displayed while being sorted in ascending order of corresponding number of times of detection. Furthermore, in FIG. 10, the respective marker IDs are displayed with colors according to the corresponding numbers of times. In FIG. 10, marker IDs, the number of times of which is equal to or smaller than an average, are displayed in red; marker IDs, the number of times of which is equal to or smaller than ⅔, are displayed in yellow, and the remaining marker ID is displayed in green. Note that the sort conditions and display colors are not limited to them. In place of the display color, the character size may be changed. The display character size of the marker ID of a marker is increased with decreasing number of times of detection from captured images.

In this way, since a marker which has a relatively smaller number of times of detection from the captured images does not suffice to calculate its position and orientation, the marker ID of such marker is displayed in relatively striking color, in order to inform the user of this in an easily recognizable manner. In this manner, the user can recognize the marker to be captured more frequently.

Referring back to FIG. 7, when the user designates a button icon 706, processing for calculating the position of the currently detected marker on the reference coordinate system is started. Since the processing for calculating the position of a marker using that marker in the captured image is not the gist of this embodiment, a description thereof will not be given.

Figure 11:
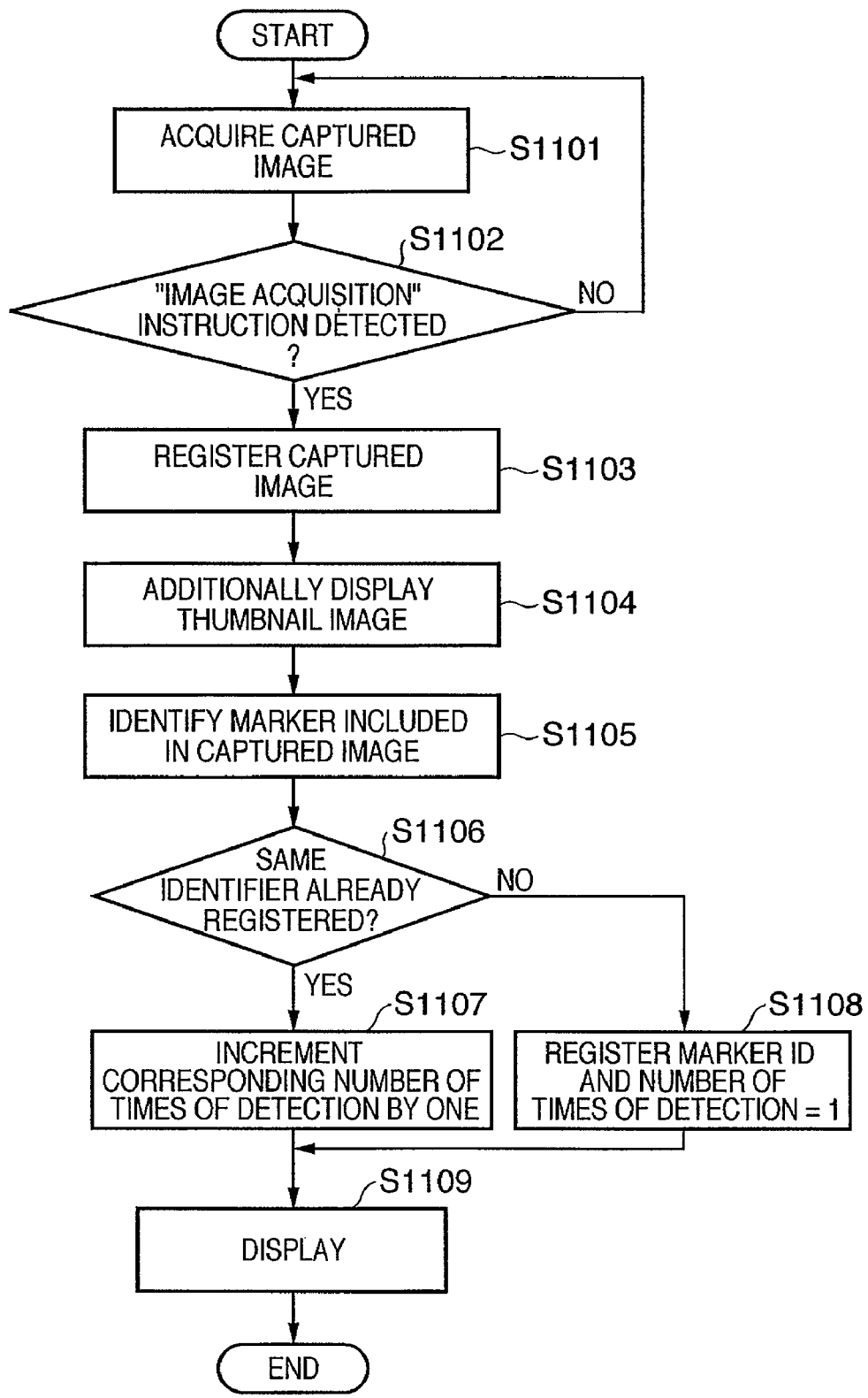
FIG. 11 is a flowchart of processing executed upon execution of a function of sorting marker IDs of markers based on the numbers of times of detection of the respective markers, and displaying the sorted marker IDs in colors corresponding to their numbers of times of detection, of the functions of the marker calibration tool.

FIG. 11 is a flowchart of processing executed upon execution of a function of sorting marker IDs of markers based on the numbers of times of detection of the respective markers, and displaying the sorted marker IDs with colors corresponding to their numbers of times of detection, of the functions of the marker calibration tool. This processing is executed by the computer system 800, i.e., the computer having the hardware arrangement shown in FIG. 3. Therefore, the CPU 301 executes the processes in respective steps to be described below.

In step S1101, the CPU 301 acquires images of frames output from the image capturing device 801 in the RAM 302, and displays the acquired images on the preview display area 701.

The CPU 301 checks in step S1102 if an "image acquisition" instruction is input by designating the button icon 702. As a result of this checking, if such instruction is not input, the process returns to step S1101. On the other hand, if that instruction is input, the process advances to step S1103.

In step S1103, the CPU 301 registers the captured image acquired from the image capturing device 801 at the detection timing of that designation in the external storage device 306.

In step S1104, the CPU 301 generates a thumbnail image of the captured image to be registered, and additionally displays it in the area 704.

In step S1105, if the captured image to be registered includes a marker, the CPU 301 executes identification processing of that marker.

The CPU 301 checks in step S1106 if an identifier (identifier of interest) specified by the identification processing in step S1105 has already been registered in the external storage device 306. As a result of this checking, if that identifier has not been registered, the process advances to step S1108.

In step S1108, the CPU 301 registers a set of the identifier of interest and the number of times of detection=1 in the external storage device 306. On the other hand, if the identifier has been registered, the process advances to step S1107.

In step S1107, the CPU 301 increments the number of times of detection which is registered in the external storage device 306 and forms the set with the interest identifier by one.

In step S1109, the CPU 301 displays the sets which are registered in the external storage device 306 and are sorted in ascending order of number of times of detection in the display area 705. In this case, the CPU 301 displays these sets in predetermined colors according to the numbers of times of detection.

Note that the processing described in this embodiment, i.e., processing for managing the numbers of times of detection of indices for respective identifiers, and displaying a list of identifiers in colors corresponding to the numbers of times of detection in ascending order of number of times of detection may be added to that described in the first embodiment.

Other Embodiments

The objects of the present invention can be achieved as follows. That is, a recording medium (or storage medium), which records a program code of software that can implement the functions of the above-mentioned embodiments is supplied to a system or apparatus. Of course, this recording medium is a computer-readable storage medium. A computer (or a CPU or MPU) of the system or apparatus reads out and executes the program code stored in the recording medium. In this case, the program code itself read out from the recording medium implements the functions of the above-mentioned embodiments, and the recording medium which records the program code constitutes the present invention.

When the computer executes the readout program code, an operating system (OS) or the like running on the computer performs some or all of actual processing operations based on an instruction of the program code. The present invention also includes a case wherein the functions of the above-mentioned embodiments are implemented by this processing.

Furthermore, assume that the program code read out from the recording medium is written in a memory of a function expansion card or a function expansion unit, which is inserted in or connected to the computer. After that, the functions of the above-mentioned embodiments are implemented by some or all of actual processing operations executed by a CPU or the like arranged in the function expansion card or function expansion unit based on an instruction of the program code. Such case is also included in the present invention.

When the present invention is applied to the recording medium, that recording medium stores program codes corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-089047 filed Mar. 29, 2007 which is hereby incorporated by reference herein in its entirety.

What is claimed is:

1. An image processing apparatus comprising:
an acquisition unit adapted to acquire a captured image from an image capturing device that captures a plurality of images of a physical space on which a plurality of indices are allocated;
a registration unit adapted to acquire, for each index included in the captured image acquired by said acquisition unit, a set of index identification information unique to an interest index, image coordinates of the interest index in the captured image, and image identification information unique to the captured image, which are obtained by applying identification processing to the interest index included in the captured image acquired by said acquisition unit, and to register the acquired set in a memory;
a management unit adapted to manage the numbers of times of previous identification for respective pieces of index identification information of indices that undergo the identification processing by said registration unit;
a display unit adapted to display the number of times managed by said management unit in association with index identification information in the set to be registered, every time said registration unit registers the set; and a calculation unit adapted to calculate, using a set group registered in the memory, positions and orientations of indices corresponding to the set groups.

2. The apparatus according to claim 1, wherein said registration unit executes registration processing every time said registration unit receives a registration instruction from a user.

3. The apparatus according to claim 1, wherein said display unit further displays the captured image acquired by said acquisition unit.

4. The apparatus according to claim 1, wherein said display unit displays an index in the captured image in a display mode according to the number of times managed by said management unit in association with that index.

5. The apparatus according to claim 1, wherein every time said registration unit registers the set, said display unit further displays information indicating whether or not a position and orientation of an index corresponding to a set including the same index identification information as the registered set of the set group registered in the memory have already been calculated.

6. The apparatus according to claim 1, wherein said calculation unit starts the calculation in response to an instruction from a user.

7. The apparatus according to claim 1, wherein when all the numbers of times managed by said management unit are not less than a threshold, said calculation unit starts the calculation.

8. The apparatus according to claim 1, further comprising a second display unit adapted to display a list of the numbers of times managed by said management unit, which are sorted according to a pre-set condition.

9. The apparatus according to claim 8, wherein said second display unit displays the numbers of times in the list in colors according to the corresponding numbers of times.

10. An image processing method comprising:

an acquisition step of acquiring a captured image from an image capturing device that captures a plurality of images of a physical space on which a plurality of indices are allocated;

a registration step of acquiring, for each index included in the captured image acquired in the acquisition step, a set of index identification information unique to an interest index, image coordinates of the interest index in the captured image, and image identification information unique to the captured image, which are obtained by applying identification processing to the interest index included in the captured image acquired in the acquisition step, and registering the acquired set in a memory;

a management step of managing the numbers of times of previous identification for respective pieces of index identification information of indices that undergo the identification processing in the registration step;

a display step of displaying the number of times managed in the management step in association with index identification information in the set to be registered, every time the set is registered in the registration step; and a calculation step of calculating, using a set group registered in the memory, positions and orientations of indices corresponding to the set groups.

11. A non-transitory computer-readable storage medium for storing a computer program for making a computer execute an image processing method according to claim 10.

* * * * *